(12) United States Patent
Hagiwara (10) Patent No.: US 6,253,155 B1
(45) Date of Patent: Jun. 26, 2001

(54) ENHANCED VERTICAL RESOLUTION FOR LOGGING TOOLS USING WALSH-TRANSFORM DECONVOLUTION

(75) Inventor: Teruhiko Hagiwara, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 09/439,629

(22) Filed: Nov. 12, 1999

(51) Int. Cl.[7] .................................................. G06F 19/00
(52) U.S. Cl. ................................................................ 702/9
(58) Field of Search ........................ 702/6–10; 324/338, 324/339; 367/46, 25; 73/152.03

(56) References Cited

U.S. PATENT DOCUMENTS

| | | | |
|---|---|---|---|
| 4,562,556 | * 12/1985 | Ingram et al. | 702/6 |
| 5,227,972 | * 7/1993 | Jacobson | 702/8 |
| 5,329,235 | * 7/1994 | Zhou et al. | 324/338 |
| 5,506,769 | * 4/1996 | Fu et al. | 702/8 |
| 5,619,411 | * 4/1997 | Smith | 702/8 |
| 6,049,209 | * 4/2000 | Xiao et al. | 324/339 |

OTHER PUBLICATIONS

Gadeken, L.L., et al., "The Utility of Combining Smoothing and Deconvolution in Processing Algorithms for Well Log Data", Nuclear Science Symposium, Oct. 22–27, 1990, pp. 810–816.*

\* cited by examiner

Primary Examiner—Donald E. McElheny, Jr.
(74) Attorney, Agent, or Firm—Conley, Rose & Tayon, P.C.

(57) ABSTRACT

A method of processing logs to enhance vertical resolution is disclosed. In one embodiment the method includes: (a) obtaining a measurement signal from a sensor tool moving through a borehole; (b) determining a Walsh deconvolution filter; and (c) integrating a product of the Walsh deconvolution filter and the measurement signal to obtain an enhanced measurement signal. The Walsh deconvolution filter may be determined by obtaining a set of tool basis functions from the convolution of the tool response function with the set of Walsh basis functions, calculating a tool response correlation matrix, inverting the tool response correlation matrix, and finding the sum

$$F(z; z') = \sum_k \sum_l Y^{-1}(k, l) W(k; z) Y(l; z').$$

This method may be used for continuous or discrete measurement samples. This method may also be applied to two-dimensional, or time-decay, logs to enhance their spatial resolution.

19 Claims, 7 Drawing Sheets

ENHANCED VERTICAL RESOLUTION FOR LOGGING TOOLS USING WALSH-TRANSFORM DECONVOLUTION

BACKGROUND OF THE INVENTION

The present invention generally relates to oilfield logging systems, and more specifically relates to a signal processing method for enhancing resolution of logging tool measurements.

Modern petroleum drilling and production operations demand a great quantity of information relating to parameters and conditions downhole. Such information typically includes characteristics of the earth formations traversed by the wellbore, along with data relating to the size and configuration of the borehole itself. The collection of information relating to conditions downhole, which commonly is referred to as "logging", can be performed by several methods.

In conventional oil well wireline logging, a probe or "sonde" housing formation sensors is lowered into the borehole after some or all of the well has been drilled, and is used to determine certain characteristics of the formations traversed by the borehole. The upper end of the sonde is attached to a conductive wireline that suspends the sonde in the borehole. Power is transmitted to the sensors and instrumentation in the sonde through the conductive wireline. Similarly, the instrumentation in the sonde communicates information to the surface by electrical signals transmitted through the wireline. Since the sonde is in direct electrical contact with the surface installation, the communications delay is negligible. Accordingly, measurements can be made and communicated in "real time".

A disadvantage of obtaining downhole measurements via wireline is that the drilling assembly must be removed or "tripped" from the drilled borehole before the desired borehole information can be obtained. This can be both time-consuming and extremely costly, especially in situations where a substantial portion of the well has been drilled. In this situation, thousands of feet of tubing may need to be removed and (if offshore) stacked on the platform. Typically, drilling rigs are rented by the day at a substantial cost. Consequently, the cost of drilling a well is directly proportional to the time required to complete the drilling process. Removing thousands of feet of tubing to insert a wireline logging tool can be an expensive proposition.

As a result, there has been an increased emphasis on the collection of data during the drilling process. Collecting and processing data during the drilling process eliminates the necessity of removing or tripping the drilling assembly to insert a wireline logging tool. It consequently allows the driller to make accurate modifications or corrections as needed to optimize performance while minimizing down time. Designs for measuring conditions downhole including the movement and location of the drilling assembly contemporaneously with the drilling of the well have come to be known as "measurement-while-drilling" techniques, or "MWD". Similar techniques, concentrating more on the measurement of formation parameters, commonly have been referred to as "logging while drilling" techniques, or "LWD". While distinctions between MWD and LWD may exist, the terms MWD and LWD often are used interchangeably. For the purposes of this disclosure, the term LWD will be used with the understanding that this term encompasses both the collection of formation parameters and the collection of information relating to the movement and position of the drilling assembly.

A number of techniques have been used for carrying out wireline and/or LWD measurements. These include, among others, resistivity, permittivity, magnetic permeability, acoustic speed, nuclear magnetic resonance (NMR), gamma radiation (GR) and thermal neutron delay (TMD) measurement techniques. One problem with the logging tools that make these measurements is a limited vertical resolution. Each tool has a "tool response" that extends over a measurement region, causing the tool to provide a measurement that represents a weighted average of material properties in that region. This averaging effect "smears" the property measurements, and creates the possibility that fine-resolution features (e.g. thin beds and sharp boundaries) may be missed.

"Forward Deconvolution" is one technique that enhances tool resolution. In the forward deconvolution technique, an approximate or estimated model of the formation is made from the data logs. This model of the formation is essentially an estimate of the characteristics of the formation. After the model of the formation is generated, a computer model of the tool response is used to transform the estimated model of the formation into an estimated log. This estimated log is then compared with the actual log data. One or more parameters of the model formation are then adjusted based on this comparison of the estimated log to the actual log data, a new estimated log is calculated, a new comparison is made, and the process repeats. Thus, the forward deconvolution technique iteratively refines the model formation until the simulated log approximates the actual log. This technique is extremely computation intensive.

Consequently, existing techniques for enhancing vertical resolution may be too computationally burdensome, making it infeasible to resolve with sufficient accuracy thin beds with a thickness less than the vertical resolution of the logging tool. Thus, present technology may not be able to adequately detect and measure thin beds that contain retrievable oil or other retrievable hydrocarbons. A feasible tool or technique is needed to detect and measure these thin underground layers or beds. Ideally, this tool or technique could be used with most or all of the pre-existing oil field technology.

SUMMARY OF THE INVENTION

Accordingly, there is disclosed herein a method of processing logs to enhance vertical resolution. In one embodiment the method includes: (a) obtaining a measurement signal from a sensor tool moving through a borehole; (b) determining a Walsh deconvolution filter; and (c) integrating a product of the Walsh deconvolution filter and the measurement signal to obtain a measurement signal having an enhanced resolution. The Walsh deconvolution filter may be determined by obtaining a set of tool basis functions from the convolution of the tool response function with the set of Walsh basis functions, calculating a tool response correlation matrix, inverting the tool response correlation matrix, and finding the sum $$F(z; z') = \sum_k \sum_l Y^{-1}(k, l) W(k; z) Y(l; z').$$

This method may be used for continuous or discrete measurement samples.

Thus, the present invention comprises a combination of features and advantages which enable it to overcome various problems of prior devices. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

For a more detailed description of the preferred embodiment of the present invention, reference will now be made to the accompanying drawings, wherein.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENT

Figure 1:
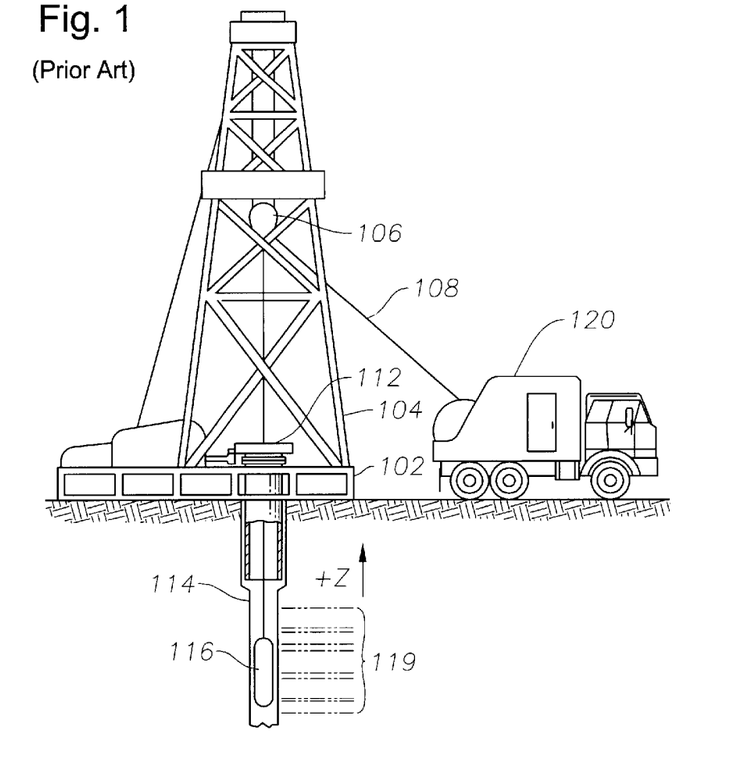
FIG. 1 shows a wireline logging operation on a well.

Turning now to the figures, FIG. 1 shows a well during wireline logging operations. A drilling platform 102 is equipped with a derrick 104 that supports a hoist 106. Drilling of oil and gas wells is commonly carried out by a string of drill pipes connected together by "tool" joints so as to form a drilling string that is lowered through a rotary table 112 into a wellbore 114. In FIG. 1, it is assumed that the drilling string has been temporarily removed from the wellbore 114 to allow a sonde 116 to be lowered by wireline 118 into the wellbore 114. Typically, the sonde 116 is lowered to the bottom of the region of interest and subsequently pulled upward at a constant speed. During the upward trip, the sonde 116 performs measurements on the formations 119 adjacent to the wellbore as they pass by. The measurement data is communicated to a logging facility 120 for storage, processing, and analysis. Logging facility 120 may be provided with electronic equipment for performing vertical resolution enhancement signal processing.

Figure 2:
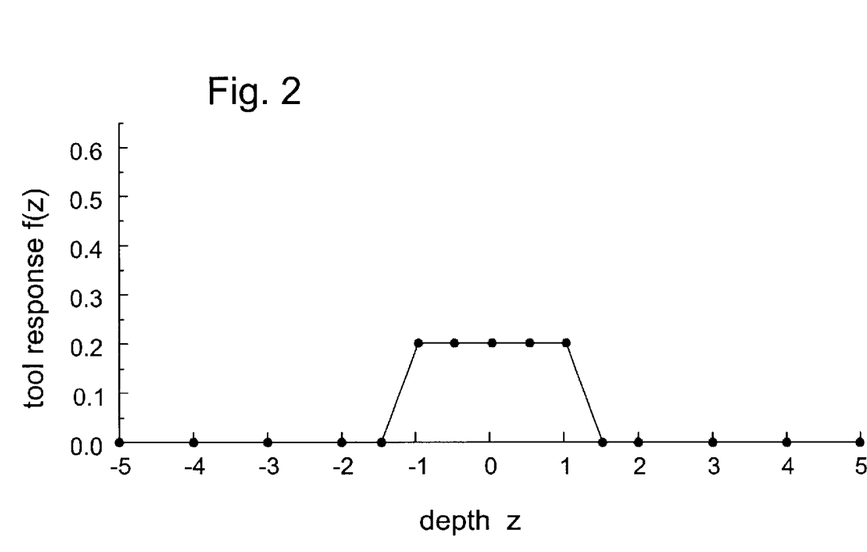
FIG. 2 is a graph of an exemplary logging tool response.
Figure 3:
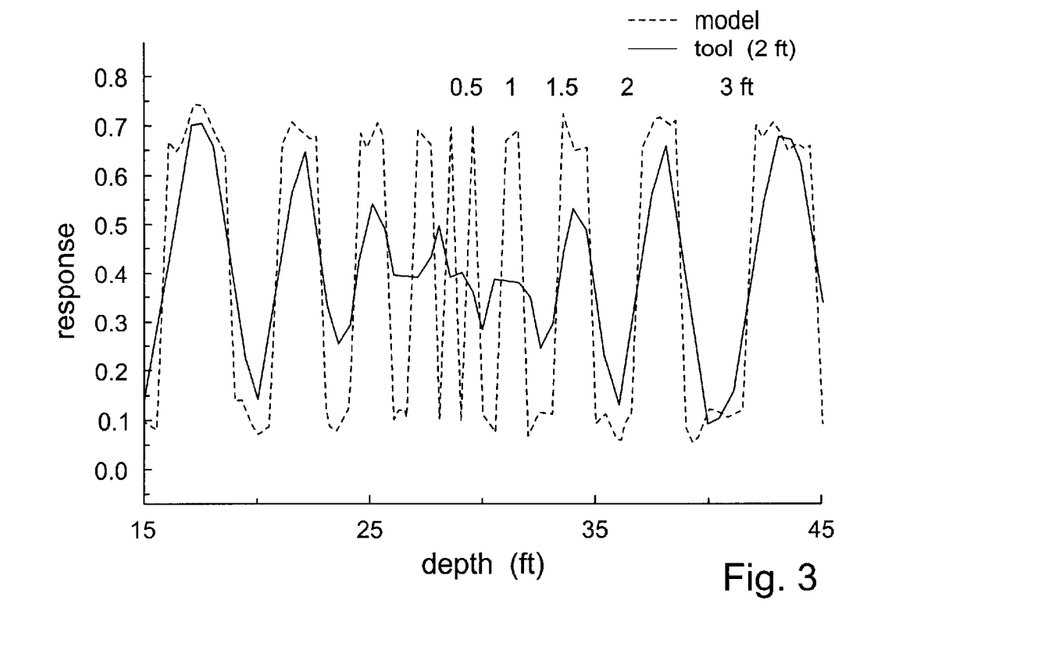
FIG. 3 is a graph comparing a formation property model to logging tool measurements.

FIG. 2 shows an exemplary tool response for a sonde instrument such as a NMR tool or a TMD tool. The horizontal axis represents distance in the vertical direction from the center of the tool. The vertical axis represents sensitivity to measured properties of materials at that position. A tool having the illustrated response will provide a measurement that is a straight average of properties of material in a two foot region centered at the tool location. As shown in FIG. 3, this averaging effect prevents tool measurements from reflecting sharp changes that may occur in the formation. The broken line represents the actual properties (e.g. resistivity) of a hypothetical formation in which the beds alternate between 0.1 and 0.7. The solid line represents the measured properties as logged by the tool. The bed thicknesses decrease from 3 ft, 2 ft, 1.5 ft, 1 ft, to 0.5 ft and back up again. Only as the beds approach and exceed 2 ft do the measured properties approach the actual formation properties, and in any event, the sharp property transitions are presented as gradual transitions.

The vertical resolution of these logging tools is dictated by the tool response, although the tool speed may sometimes become an additional limiting factor. Nevertheless, because logging samples can be collected at a finer interval that the tool resolution, it is possible to enhance the tool resolution by signal processing. For example, formation properties are typically sampled every ½ ft or ¼, while the tool resolution is about 2–4 ft for many logging tools. Without enhancement, only one peak can be observed within an interval shorter than the inherent tool resolution. With enhancement, the inherent tool resolution can be improved to a resolution of approximately twice the sampling interval.

The logged properties L(z) are related to the ideal tool response R(z) (i.e., the actual formation properties) by convolution with the tool response function h(z):

$$L(z)=\int h(z-z')R(z')dz' \qquad \text{(Eqn. 1)}$$

Since the actual formation properties tend to be fairly rectangular in nature due to the sudden transitions between bed materials, it may be considered advantageous to represent the actual formation properties using a Walsh Transform:

$$R(z) = \sum_k a(k)W(k;z) \qquad \text{(Eqn. 2)}$$

where $0 \leq k < 2^m$ ($2^m$ is chosen to be the smallest power of two greater than or equal to the number of sampled points in the log), W(k;z) represents a Walsh function, and a(k) represents the kth Walsh Transform coefficient. Walsh functions have a constant magnitude over the range of the log samples, with the kth function having k transitions between the positive and negative values. The set of Walsh functions are orthonormal; ie., they have unit energy and they are mutually orthogonal. Further, they have built-in sharp transitions that may make them more suitable for representing the ideal tool response.

A substitution of Eqn. 2 into Eqn. 1 yields:

$$L(z) = \sum_k a(k)\left[\int h(z-z')W(k;z')dz'\right] \quad \text{(Eqn. 3)}$$

For convenience, the bracketed term in Eqn. 3 is hereafter represented by $Y(k;z)$. Given the logged properties $L(z)$, it is desired to determine the Walsh Transform coefficients $a(k)$ so that the actual formation properties $R(z)$ may be found using Eqn. 2. To calculate the transform coefficients, both sides of Eqn. 3 are multiplied by $Y(l;z)$ and integrated over z:

$$\int L(z)Y(l;z)dz = \sum_k a(k)\int Y(k;z)Y(l;z)dz \quad \text{(Eqn. 4)}$$

Eqn. 4 can be re-written in matrix notation using a $2^m$-element vector $\lambda$ for the integral on the left side of Eqn. 4, a $2^m \times 2^m$-element matrix Y for the integral on the right side of Eqn. 4, and a $2^m$-element vector a for the transform coefficients:

$$\lambda = aY \quad \text{(Eqn. 5)}$$

and the transform coefficient vector is found by:

$$a = \lambda Y^{-1} \quad \text{(Eqn. 6)}$$

From Eqn. 6, it may be observed that a specific transform coefficient is:

$$a(k) = \sum_l \left[\int L(z)Y(l;z)dz\right]Y^{-1}(k,l) \quad \text{(Eqn. 7)}$$

Applying Eqn. 7 to Eqn. 2, the actual formation properties can be expressed:

$$R(z) = \int\left[\sum_k\sum_l Y^{-1}(k,l)W(k;z)Y(l;z')\right]L(z')dz' \quad \text{(Eqn. 8)}$$

or, for economy of expression:

$$R(z) = \int F(z;z')L(z')dz' \quad \text{(Eqn. 9)}$$

Figure 4:
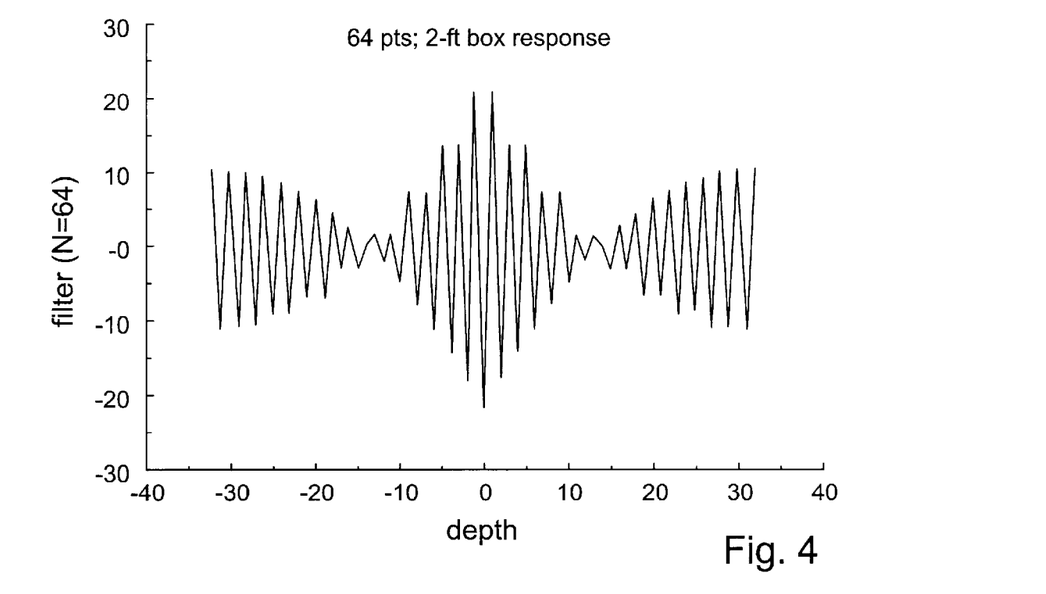
FIG. 4 is a graph of a Walsh deconvolution filter function for the logging tool response of FIG. 2.

Note that for certain tool response functions, the Walsh deconvolution filter $F(z,z')$ is not well-behaved. For instance, FIG. 4 shows the Walsh deconvolution filter $F(z;z')$ that corresponds to the tool response of FIG. 2, assuming that log samples are taken at 1ft intervals over a depth range of −32 ft to +31 ft. The deconvolution filter as a function of $(z-z')$ is highly oscillatory and its support is not confined. This behavior may be attributed to the matrix inversion of Eqn. 6, and may be corrected by adding a small positive value $\epsilon$ to the diagonal elements of matrix Y:

$$a = \lambda(Y+\epsilon I)^{-1} \quad \text{(Eqn. 10)}$$

so that the regularized Walsh deconvolution filter is expressed:

$$F(z;z';\varepsilon) = \sum_k\sum_l [Y+\varepsilon I]^{-1}(k,l)W(k;z)Y(l;z') \quad \text{(Eqn. 11)}$$

Figure 5:
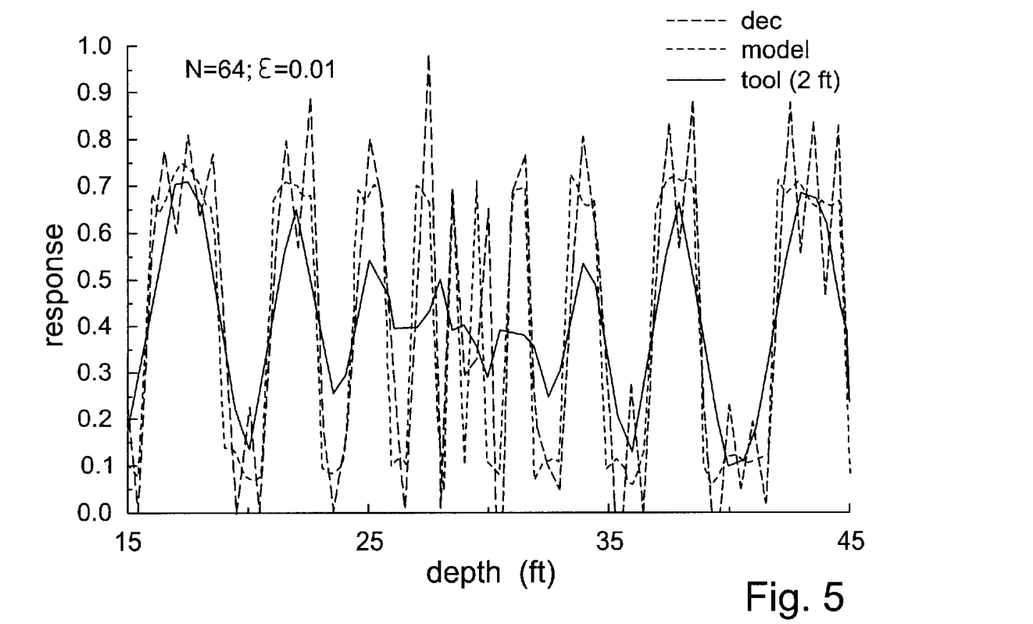
FIG. 5 is a graph comparing a first deconvolved logging tool measurement to the property model and the original logging tool measurement.
Figure 6:
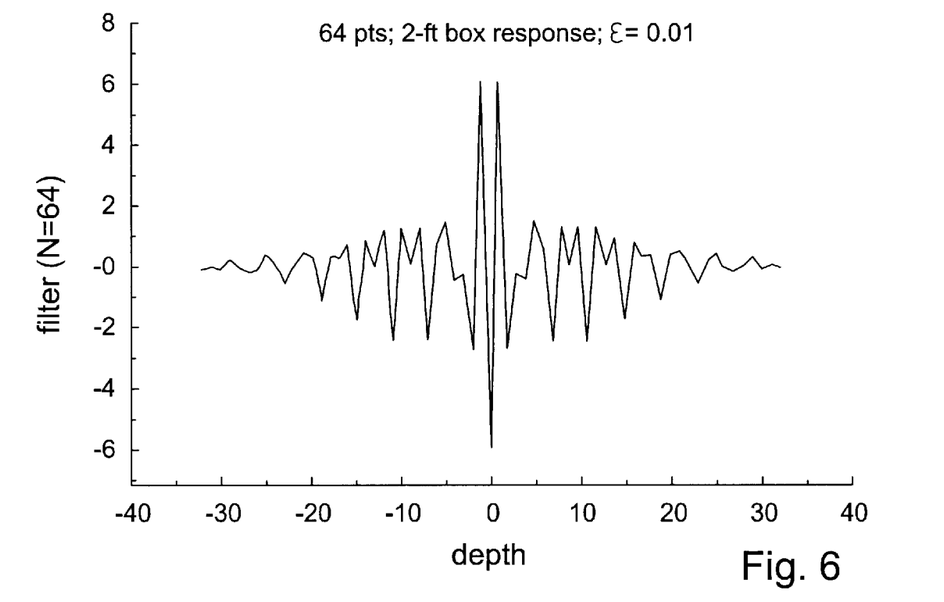
FIG. 6 is a graph of the regularized Walsh deconvolution filter used for FIG. 5.
Figure 7:
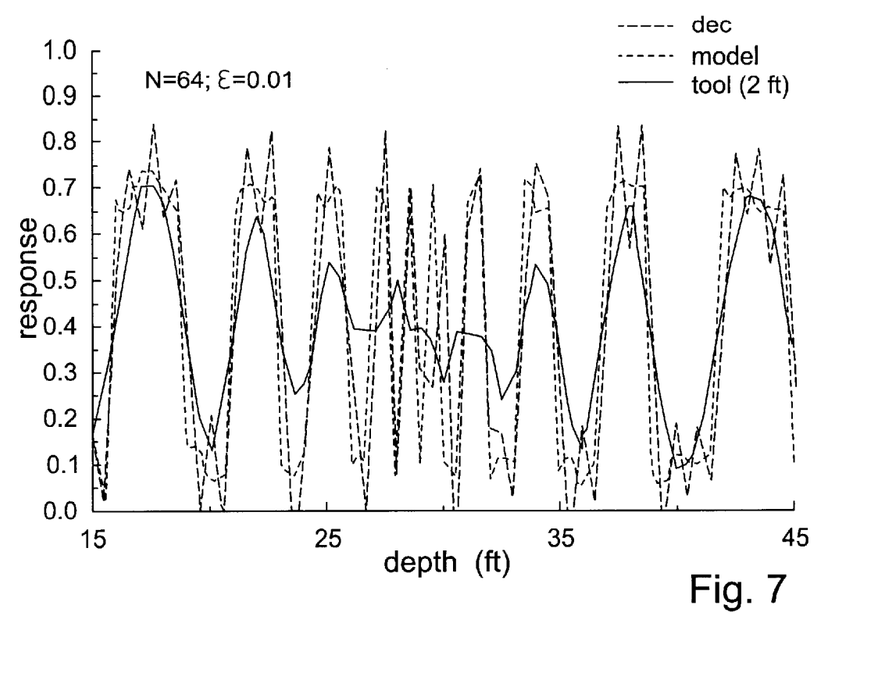
FIG. 7 is a graph comparing a second deconvolved logging tool measurement to the property model and the original logging tool measurement.
Figure 8:
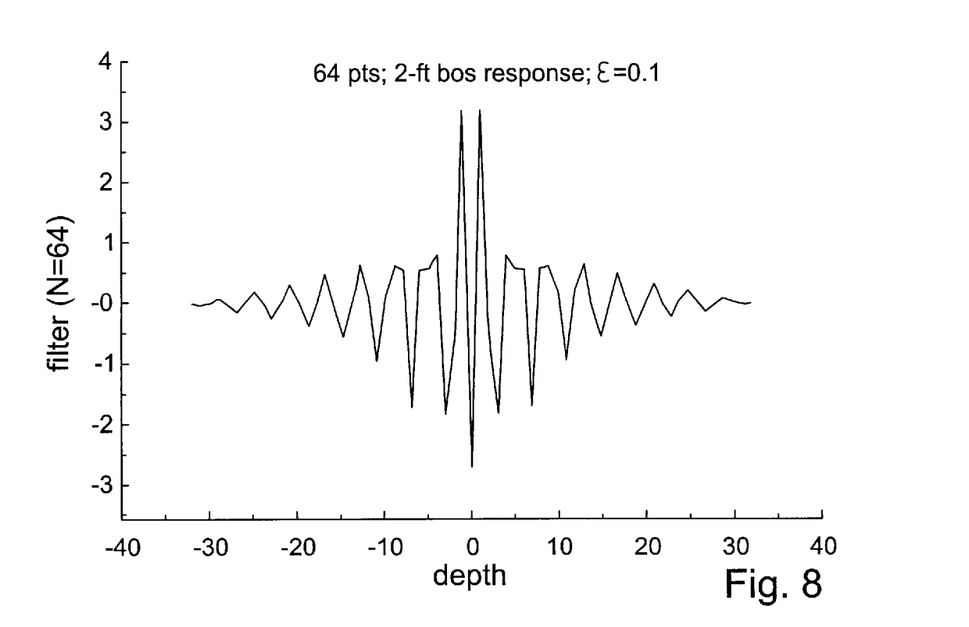
FIG. 8 is a graph of the regularized Walsh deconvolution filter used for FIG. 7.
Figure 9:
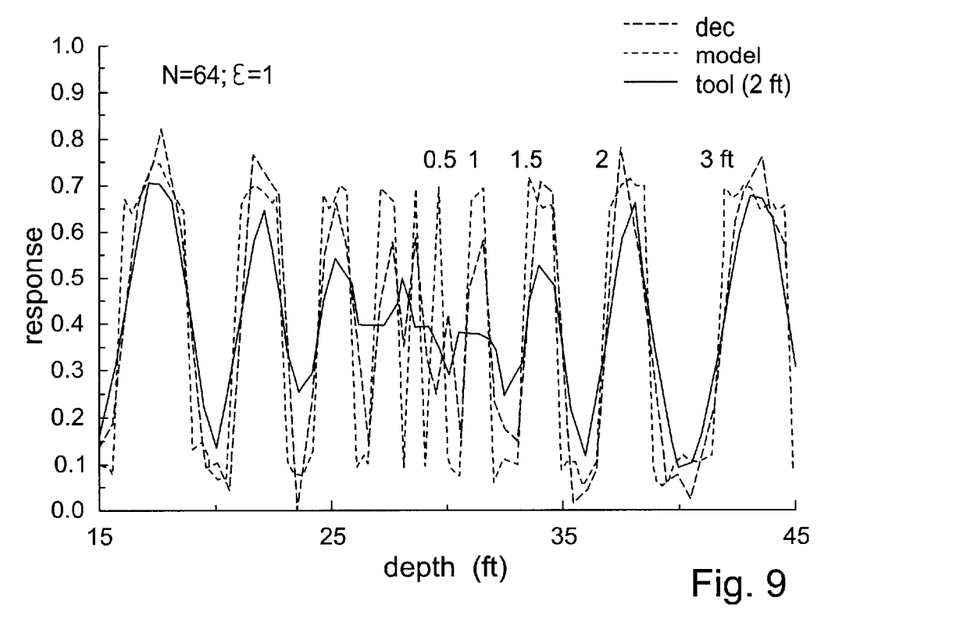
FIG. 9 is a graph comparing a third deconvolved logging tool measurement to the property model and the original logging tool measurement.
Figure 10:
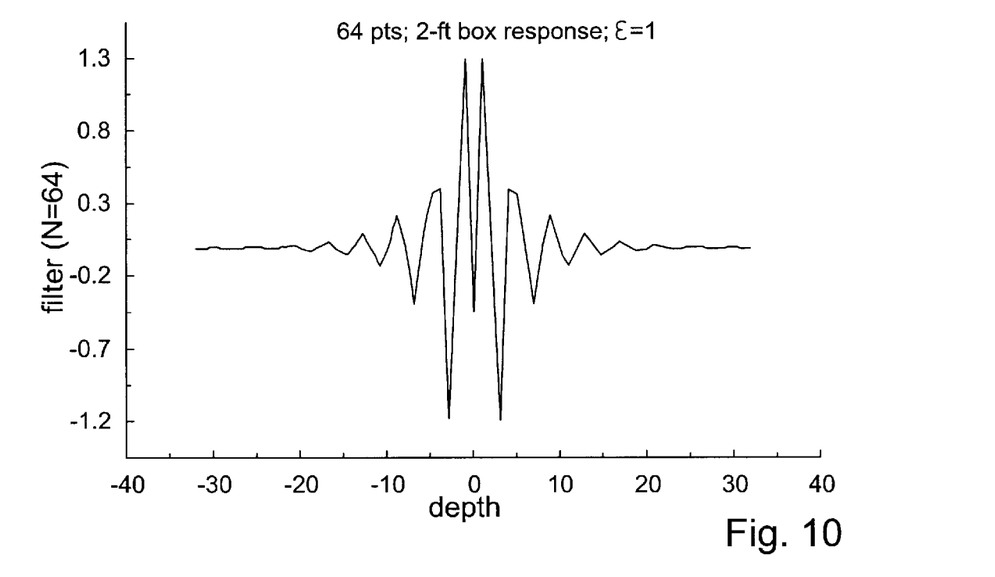
FIG. 10 is a graph of the regularized Walsh deconvolution filter used for FIG. 9.
Figure 11:
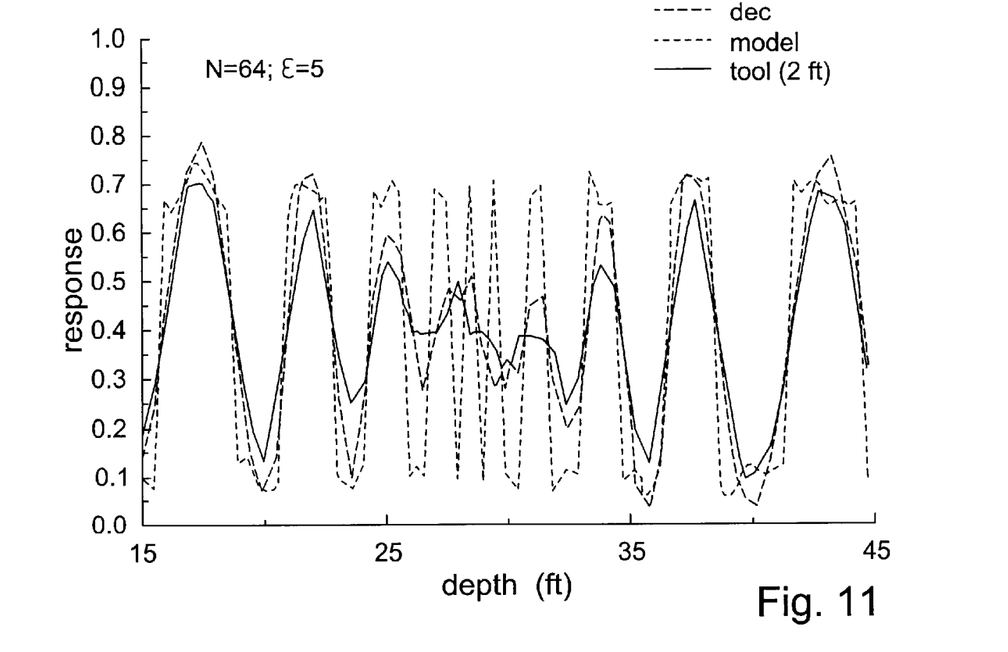
FIG. 11 is a graph comparing a fourth deconvolved logging tool measurement to the property model and the original logging tool measurement.
Figure 12:
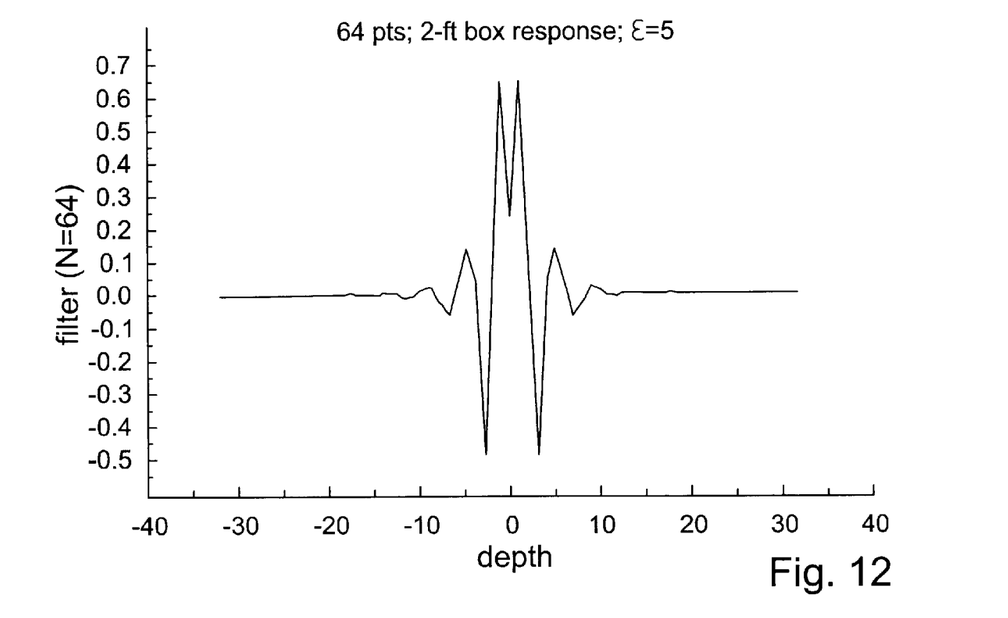
FIG. 12 is a graph of the regularized Walsh deconvolution filter used for FIG. 11.
Figure 13:
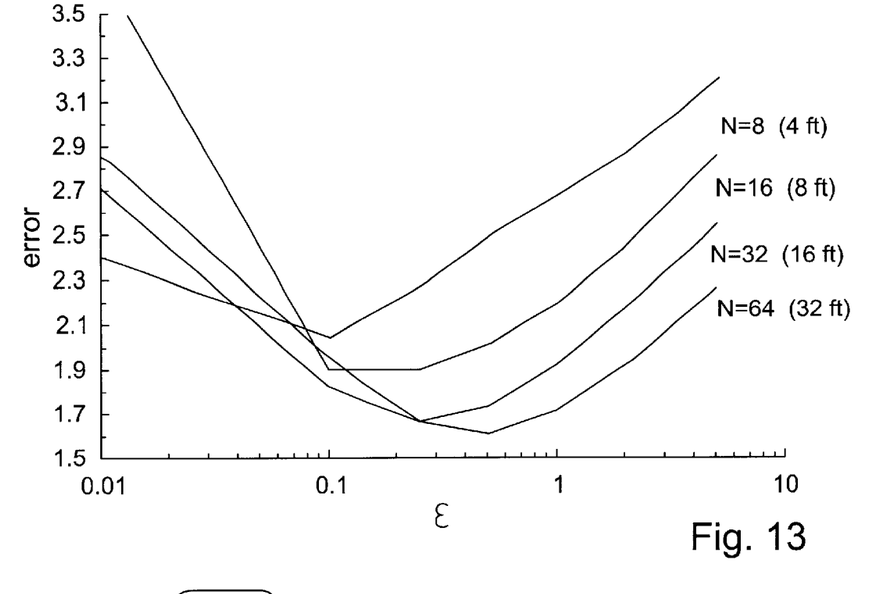
FIG. 13 is a graph of deconvolution error as a function of the regularization factor.

FIGS. 6, 8, 10 and 12 show the regularized deconvolution filters for $\epsilon=0.001$, 0.1, 1, and 5, respectively. FIGS. 5, 7, 9, and 11 show a comparison of the corresponding deconvolved tool responses (dec) with both the modeled formation (model) and the actual tool response (tool). In FIG. 5, the deconvolved tool response accurately reflects the sharp transitions present in the model, but fails to accurately reflect the property values in the medium and thick beds. In FIG. 7, the situation is improved relative to FIG. 5. In FIG. 9, however, the accuracy of the transitions are degrading, and the property values of the thinner beds are becoming worse. In FIG. 11, the deconvolved tool response shows only a small improvement relative to the actual tool response. FIG. 13 shows a graph of error between the deconvolved tool responses and the model formation properties as a function of $\epsilon$ and the number of sample points. The error $\delta(\epsilon)$ is defined as $$\delta(\epsilon) = \int |R^{Dec}(z;\epsilon) - R^{Model}(z)|^2 dz \quad \text{(Eqn. 12)}$$

or, in words, the integrated square of the difference between the deconvolved tool response and the modeled formation. The minimum error $\delta(\epsilon)$ decreases as the number of samples $N=2^m$ increases. FIG. 13 also appears to indicate that the optimal value of $\epsilon$ is proportional to the number of sample points. Further simulations may be performed to determine the optimal value of $\epsilon$ over a range of expected formation types.

Figure 14:
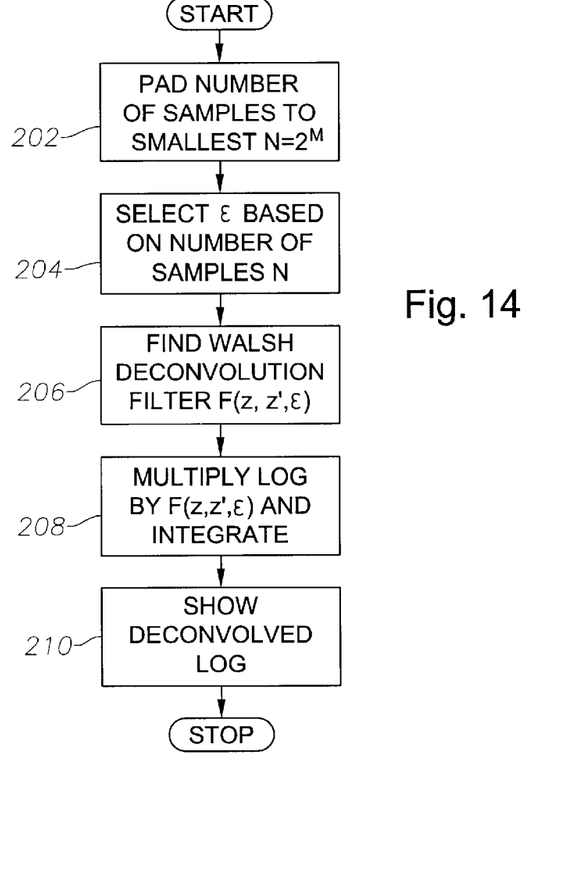
FIG. 14 is a flowchart of the Walsh deconvolution method.

FIG. 14 shows a flowchart of the Walsh transformation deconvolution process. A set of log samples is obtained, and in block 202 is padded with zeros if necessary to make the number of samples equal to a power of two. In block 204, a value is chosen for $\epsilon$ based on the number of samples and other factors if appropriate. In block 206, the regularized Walsh deconvolution filter is calculated per Eqn. 11. In block 208, the log is multiplied element by element by the Walsh deconvolution filter, and the product is integrated over z' as indicated by Eqn. 9. The result is the deconvolved log which may be plotted in block 210.

The deconvolution filter may also be applied to two dimensional data. For example, nuclear magnetic resonance (NMR) tools measure a time decay curve (aka "echo train") at each sampled position along the borehole. The NMR tools also possess a non-ideal tool response in the z-direction. An NMR log may be represented as $L(z;t)$:

$$L(z;t) = \int h(z-z')R(z';t)dz' \quad \text{(Eqn. 13)}$$

The Walsh deconvolution filter may be applied to deconvolve the tool response to obtain the true echo train at each depth z as:

$$R^{Dec}(z;t;\epsilon) = \int F(z,z';\epsilon)L(z';t)dz' \quad \text{(Eqn. 14)}$$

In an alternate approach where the true response is a T2-distribution $$R(z;t) \approx \sum_{T_2} C(z,T_2)e^{-t/T_2}, \quad \text{(Eqn. 15)}$$

the deconvolution filter may be applied to the $T_2$-distribution $C(z,T_2)$ inverted (or mapped) from he echo-train data $L(z,t)$ using standard techniques:

$$C^{Dec}(z;T_2;\epsilon)=\int F(z,z';\epsilon)C^{Log}(z';T_2)dz' \quad \text{(Eqn. 16)}$$

A new vertical resolution-enhancement method for logging tool responses has now been disclosed. The method is based on using the Walsh transform of the vertical formation property profile to obtain a devonvolution filter for logging tool measurements. In one example where the logging tool has a 2 ft vertical resolution and logging data are sampled at every ½ ft interval, the profile is recovered up to 1 ft resolution. The disclosed method is readily applied to enhance the vertical resolution of NMR logging and other logging tools that measure formation properties through time-decay spectra.

While preferred embodiments of this invention have been shown and described, modifications thereof can be made by one skilled in the art without departing from the spirit or teaching of this invention. The embodiments described herein are exemplary only and are not limiting. Many variations and modifications of the system and apparatus are possible and are within the scope of the invention. Accordingly, the scope of protection is not limited to the embodiments described herein, but is only limited by the claims that follow, the scope of which shall include all equivalents of the subject matter of the claims.

What is claimed is:

1. A method of processing logs to enhance resolution, wherein the method comprises:

obtaining a measurement signal from a sensor tool moving through a borehole;

determining a Walsh deconvolution filter; and integrating a product of the Walsh deconvolution filter and the measurement signal to obtain a measurement signal having an enhanced resolution.

2. The method of claim 1, wherein said measurement signal comprises a set of measurement samples that corresponds with a set of positions along the borehole, and wherein said determining a Walsh deconvolution filter includes:

convolving a tool response of the sensor tool with N Walsh basis functions $W(k,z)$ to obtain a set of tool basis functions $Y(k,z)$, wherein N is the number of samples in said set of measurement samples.

3. The method of claim 2, wherein said determining a Walsh deconvolution filter further includes:

calculating a tool basis correlation matrix Y, wherein the (k,l) element of Y is $$\int Y(k;z)Y(l;z)dz.$$

4. The method of claim 3, wherein said determining a Walsh deconvolution filter further includes:

inverting the tool basis correlation matrix Y.

5. The method of claim 4, wherein before inverting the tool basis correlation matrix, said determining a Walsh deconvolution filter further includes:

modifying the tool basis correlation matrix Y by adding a regularization parameter $\epsilon I$.

6. The method of claim 4, wherein said determining a Walsh deconvolution filter further includes:

calculating $$F(z;z') = \sum_k \sum_l Y^{-1}(k,l)W(k;z)Y(l;z'),$$

where $Y^{-1}(k,l)$ is the (k,l) element of the inverted tool basis correlation matrix $Y^{-1}$.

7. The method of claim 1, wherein said integrating is expressible as:

$R(z)=\int F(z;z')L(z')dz'$, where $F(z;z')$ represents the Walsh deconvolution filter, $L(z')$ represents the measurement signal, and $R(z)$ represents the enhanced measurement signal.

8. A method for enhancing the resolution of logging tool measurements, wherein the method comprises:

retrieving a set of measurement samples taken at a corresponding set of positions;

multiplying the set of measurement samples by a Walsh deconvolution filter to obtain a product; and integrating the product over the set of positions to obtain a set of enhanced measurements.

9. The method of claim 8, further comprising:

calculating said Walsh deconvolution filter.

10. The method of claim 9, wherein said calculating includes:

convolving a logging tool response function with a set of Walsh basis functions $W(k,z)$ to obtain a set of tool basis functions $Y(k,z)$.

11. The method of claim 10, wherein said calculating further includes:

computing a tool basis correlation matrix Y, wherein the (k,l) element of Y is $$\sum_i Y(k;i)Y(l;i).$$

12. The method of claim 9, wherein said calculating includes:

inverting a tool basis correlation matrix Y.

13. The method of claim 12, wherein before said inverting, said calculating further includes:

adding of a regularization parameter $\epsilon I$ to said tool basis correlation matrix Y.

14. The method of claim 12, wherein said calculating further includes:

solving $$F(i;j) = \sum_k \sum_l Y^{-1}(k,l)W(k;i)Y(l;j'),$$

where $Y^{-1}(k,l)$ is the (k,l) element of the inverted tool basis correlation matrix $Y^{-1}$.

15. The method of claim 8, wherein said integrating is expressible as:

$$R(i) = \sum_j F(i;j)L(j),$$

where $F(i;j)$ represents the Walsh deconvolution filter, $L(j)$ represents the set of measurement samples, and $R(i)$ represents the set of enhanced measurement samples.

16. A method for enhancing the spatial resolution of two-dimensional logs, wherein the method comprises:

for each spatial position in a set of spatial positions, retrieving a corresponding set of measurement samples taken as a function of time at that spatial position;

deriving a plurality of samples that share a common time index from said measurement samples, wherein said plurality includes a sample for each spatial position in the set of spatial positions;

multiplying the plurality of samples by a Walsh deconvolution filter to obtain a product; and integrating the product over the set of spatial positions to obtain a set of enhanced measurements.

17. The method of claim 16, further comprising: repeating said deriving, multiplying, and integrating for each of a set of time indices to obtain a corresponding set of enhanced measurements for each time index.

18. The method of claim 16, wherein said deriving includes:

determining a T2 distribution for each set of measurement samples; and selecting coefficients corresponding to a selected value of T2.

19. The method of claim 16, wherein said deriving includes:

selecting at least one measurement sample from each of the sets of measurement samples, wherein the selected samples correspond to a time offset from a measurement trigger performed while a logging tool was located at a corresponding spatial position.

\* \* \* \* \*